(12) United States Patent
Forstall et al.

(10) Patent No.: US 9,175,964 B2
(45) Date of Patent: Nov. 3, 2015

(54) INTEGRATED CALENDAR AND MAP APPLICATIONS IN A MOBILE DEVICE

(75) Inventors: Scott Forstall, Mountain View, CA (US); Gregory N. Christie, San Jose, CA (US); Robert E. Borchers, Pleasanton, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1791 days.

(21) Appl. No.: 12/163,862

(22) Filed: Jun. 27, 2008

(65) Prior Publication Data

US 2009/0006994 A1   Jan. 1, 2009

Related U.S. Application Data

(60) Provisional application No. 60/946,921, filed on Jun. 28, 2007.

(51) Int. Cl.
| | |
|---|---|
| *G06F 3/048* | (2013.01) |
| *G01C 21/20* | (2006.01) |
| *G01C 21/26* | (2006.01) |
| *G06Q 10/10* | (2012.01) |

(52) U.S. Cl.
CPC ............... *G01C 21/20* (2013.01); *G01C 21/26* (2013.01); *G06Q 10/109* (2013.01)

(58) Field of Classification Search
CPC ................................ G06F 3/048; G01C 21/00
USPC ........................................ 715/751, 75, 3, 753
See application file for complete search history.

(56) References Cited

U.S. PATENT DOCUMENTS

| | | | |
|---|---|---|---|
| 5,948,040 A * | 9/1999 | DeLorme et al. | 701/426 |
| 6,480,783 B1 | 11/2002 | Myr | |
| 6,678,215 B1 | 1/2004 | Treyz | |
| 7,139,722 B2 | 11/2006 | Perrella et al. | |
| 7,941,753 B2 | 5/2011 | Meisels et al. | |
| 2001/0056443 A1* | 12/2001 | Takayama et al. | 707/513 |
| 2004/0267887 A1 | 12/2004 | Berger et al. | |
| 2005/0027437 A1 | 2/2005 | Takenaga et al. | |

(Continued)

FOREIGN PATENT DOCUMENTS

| | | |
|---|---|---|
| DE | 19818348 A1 | 10/1999 |
| EP | 1146739 A2 | 10/2001 |

(Continued)

OTHER PUBLICATIONS

PCT International Search Report and Written Opinion for PCT International Appln No. PCT/US08/08004 mailed Jan. 8, 2009. (12 pages).

(Continued)

*Primary Examiner* — Peiyong Weng
(74) *Attorney, Agent, or Firm* — Kilpatrick Townsend & Stockton LLP

(57) ABSTRACT

Techniques, computer programs and apparatus relating to an integrated calendar and map feature are described. In one implementation, one or more calendar entries are identified in a calendar. A calendar entry includes an associated time and an associated location. A display of a map is provided including a graphical representation indicating a location associated with at least one calendar entry. The location associated with the calendar entry is derived from the calendar entry and included in a request to a map application for the map.

18 Claims, 13 Drawing Sheets

(56) References Cited

U.S. PATENT DOCUMENTS

| | | | |
|---|---|---|---|
| 2005/0091096 A1* | 4/2005 | Coates et al. | 705/8 |
| 2005/0132004 A1* | 6/2005 | Horvitz et al. | 709/204 |
| 2005/0132305 A1* | 6/2005 | Guichard et al. | 715/855 |
| 2006/0166656 A1 | 7/2006 | Klicpera et al. | |
| 2006/0218029 A1 | 9/2006 | Chin | |
| 2006/0240877 A1 | 10/2006 | Filiba et al. | |
| 2007/0060108 A1 | 3/2007 | East et al. | |
| 2007/0118415 A1 | 5/2007 | Chen et al. | |
| 2007/0271031 A1 | 11/2007 | Jung et al. | |
| 2008/0086455 A1* | 4/2008 | Meisels et al. | 707/3 |
| 2008/0167937 A1 | 7/2008 | Coughlin | |
| 2009/0006994 A1 | 1/2009 | Forstall et al. | |
| 2009/0152349 A1* | 6/2009 | Bonev et al. | 715/753 |
| 2009/0265091 A1 | 10/2009 | Machii et al. | |

FOREIGN PATENT DOCUMENTS

| | | |
|---|---|---|
| EP | 1562321 A2 | 8/2005 |
| JP | 2000321380 A | 11/2000 |
| JP | 2008089438 A | 4/2008 |
| JP | 4091077 B2 | 5/2008 |
| KR | 20070067821 A | 6/2007 |

OTHER PUBLICATIONS

PCT International Search Report and Written Opinion (dated Jan. 3, 2010), International Application No. PCT/US2009/057210, International Filing Date Sep. 16, 2009, (18 pages).

PCT International Preliminary Report on Patentability (mailed Mar. 31, 2011), International Application No. PCT/US2009/057210, International Filing Date Sep. 16, 2009, (9 pages).

PCT International Search Report and Written Opinion for PCT International Application No. PCT/US08/08004 mailed Jan. 8, 2009 (11 pages).

PCT International Preliminary Report on Patentability for PCT International Application No. PCT/US2008/008004 dated Jan. 5, 2010 (9 pages).

PCT International Search Report and Written Opinion (dated Mar. 1, 2010), International Application No. PCT/US2009/057210, International Filing Date Sep. 16, 2009, (18 pages).

PCT Invitation to Pay Additional Fees/Partial International Search (dated Dec. 9, 2009), International Application No. PCT/US2009/057210, International Filing Date Sep. 16, 2009, (5 pages).

PCT International Preliminary Report on Patentability (mailed Mar. 31, 2011), International Application No. PCT/US2009/057210, International Filing Date Sep. 16, 2009, (10 pages).

Office Action dated Jun. 6, 2012 issued by the Chinese Patent Office for Chinese Application for Invention No. 200980141509.5.

Office Action mailed Mar. 25, 2013 in Japanese Patent Application No. 2011-527945, 6 pages.

Office Action mailed Aug. 7, 2014 in Japanese Patent Application No. 2011-527945, 3 pages.

Office Action mailed Oct. 29, 2012 in Korean Patent Application No. 10-2011-7008662, 4 pages.

* cited by examiner

INTEGRATED CALENDAR AND MAP APPLICATIONS IN A MOBILE DEVICE

This application claims the benefit, under 35 U.S.C. §119 (e), of the filing date of U.S. Provisional Application No. 60/946,921, filed on Jun. 28, 2007, and this application is hereby incorporated herein by reference.

FIELD OF THE INVENTION

This invention generally relates to mobile devices.

BACKGROUND

Conventional mobile devices are often dedicated to performing a specific application. For example, a mobile phone provides telephony services; a personal digital assistant (PDA) provides a way to organize address, contacts and notes; a media player plays content; email devices provide email communication, etc. Modern mobile devices can include two or more of these applications. Typically, the two or more applications operate independent of one another, and the device functions as a combination of two or more of the devices described above.

SUMMARY OF THE DESCRIPTION

This invention relates to mobile devices. In general, in one aspect, the invention features a method including identifying one or more calendar entries in a calendar, where a calendar entry includes an associated time and an associated location. A display of a map is provided including a graphical representation indicating a location associated with at least one calendar entry. The location associated with the calendar entry is derived from the calendar entry and included in a request to a map application for the map.

Implementations of the invention can include one or more of the following features. The calendar can include a first calendar entry associated with a first time on a date and a second calendar entry associated with a later second time on the same date. The map can include a graphical representation indicating locations associated with both calendar entries. A route can be provided superimposed on the map indicating a route from a location associated with the first calendar entry to a location associated with the second calendar entry. Providing the display of the map and the route can be automatic based on times associated with the calendar entries represented on the map. Providing the display of the map and the route automatically based on the times associated with the calendar entries can include providing the display of the map and the route at a predetermined time, before the second time associated with the second calendar entry, and after the first time associated with the first calendar entry has passed. Providing the display of the map and the route can be in response to a user request for map and route information. The route information can include, for example, a graphical display of the route superimposed on the map, textual directions for the route and/or audio directions for the route.

In response to a user input selecting a first calendar entry and selecting to send an automated message, a message of predetermined content can be automatically sent to a person associated with the first calendar entry. The predetermined content of the message can be content indicating the user will be late for an appointment represented by the first calendar entry. The message can be a voice message, an email message or a short message.

The calendar can include a first calendar entry having an associated first time and first location. A current location can be determined, and route information can be obtained for a route from the current location to the first location, where the route information includes an estimated travel time. An alarm indication of the upcoming first calendar entry at an alarm time based on the estimated travel time can be provided.

A current location can be determined, and route information can be provided corresponding to a route from the current location to the location associated with the at least one calendar entry. The calendar can include a first calendar entry associated a person having a name. In response to a user input selecting the first calendar entry, a data structure including contact information corresponding to contacts can be searched for a contact having a same name as the person associated with the first calendar entry. If a contact is located, at least some of the contact information can be provided to the user.

In general, in another aspect, the invention features a system including a calendar application operable to receive calendar entries, where a calendar entry includes at least one field for an associated time and location. A map application operable to provide a display of a map is further included in the system. A processor included in the system is operable to provide a location associated with a calendar entry to the map application and request a map including a graphical representation of the location associated with a calendar entry. Further, the system includes a display operable to display the map.

Implementations of the invention can include one or more of the following features. The processor can be further configured to automatically request the map from the map application at a certain time before a time associated with the calendar entry. The system can further include an engine operable to provide route information for a route between a first location associated with a first calendar entry and a second location associated with a later second calendar entry, the route information including an estimated travel time. The map can be displayed with the route superimposed thereon and including indications of the first and second locations. The processor can be configured to automatically request a display of the map including the route superimposed thereon, at least no less than the estimated travel time before a time associated with later second calendar entry. The system can further include a positioning system operable to obtain a current location of a mobile device, and an engine operable to provide a graphical display on the map of a route from the current location to a location associated with a first calendar entry, where the first calendar entry is the next calendar entry occurring in time from a current time.

In one implementation, the system further includes a telephony application, and the processor is further configured to receive a user selection of a first calendar entry associated with a first person having a first telephone number and a user selection of the telephony application, and in response to the selections to automatically initiate a telephone call to the first telephone number. In another implementation the system includes an email application, and the processor is further configured to receive a user selection of a first calendar entry associated with a first person having a first email address and a user selection of the email application, and in response to the selections to automatically initiate an email message addressed to the first email address. In yet another implementation, the system includes a short messaging service application, and the processor is further configured to receive a user selection of a first calendar entry associated with a first person and a user selection of the short messaging service application and in response to the selections to automatically initiate a short message addressed to the first person.

In general, in another aspect, the invention features a computer-readable medium having instructions stored thereon, which, when executed by a processor, cause the processor to perform operations including identifying one or more calendar entries in a calendar, where a calendar entry includes an associated time and an associated location, and providing a display of a map including a graphical representation indicating a location associated with at least one calendar entry. The location associated with the calendar entry is derived from the calendar entry and included in a request to a map application for the map.

Implementations of the invention can include one or more of the following features. The calendar can include a first calendar entry associated with a first time on a date and a second calendar entry associated with a later second time on the same date, and the map can include a graphical representation indicating locations associated with both calendar entries. The instructions further cause the processor to perform operations including providing a route superimposed on the map indicating a route from a location associated with the first calendar entry to a location associated with the second calendar entry.

Providing the display of the map and the route can be automatic based on times associated with the calendar entries represented on the map. Providing the display of the map and the route automatically based on the times associated with the calendar entries can include providing the display of the map and the route at a predetermined time before the second time associated with the second calendar entry and after the first time associated with the first calendar entry has passed.

The instructions can further cause the processor to perform operations including, in response to a first user input selecting a first calendar entry and selecting to send an automated message, automatically sending a message of predetermined content to a person associated with the first calendar entry. The calendar can include a first calendar entry having an associated first time and first location, where the instructions further cause the processor to perform operations including determining a current location and obtaining route information for a route from the current location to the first location, where the route information includes an estimated travel time. An alarm indication can be provided of the upcoming first calendar entry at an alarm time based on the estimated travel time.

The calendar can include a first calendar entry having an associated first time and first location, where the instructions further cause the processor to perform operations including determining a current location, and providing route information to the user corresponding to a route from the current location to the location associated with the at least one calendar entry. The calendar can include a first calendar entry associated with a person having a name, where the instructions further cause the processor to perform operations including, in response to a user input selecting the first calendar entry, searching a data structure including contact information corresponding to contacts for a contact having the same name as the person associated with the first calendar entry. If a contact is located, at least some of the contact information can be provided to the user.

In general, in another aspect, the invention features a system including a processor and a storage device. The storage device is coupled to the processor and configurable for storing instructions, which, when executed by the processor cause the processor to perform operations. The operations include receiving one or more calendar entries in a calendar, where a calendar entry includes an associated time and an associated location, and providing a display of a map including a graphical representation indicating a location associated with at least one calendar entry. The location associated with the at least one calendar entry is derived from the calendar entry and included in a request to a map application for the map.

In general, in another aspect, the invention features a mobile device including a calendar application operable to receive calendar entries, where a calendar entry includes an associated time and location and a map application operable to provide a display of a map. The mobile device further includes a processor operable to provide a location associated with a calendar entry to the map application and request a map including a graphical representation of the location associated with a calendar entry. The mobile device includes a display operable to display the map.

In general, in another aspect, the invention features a method including receiving a request from a mobile device for map information, the request including a location wherein the location was derived by the mobile device from an associated calendar entry included in a calendar residing on the mobile device, and providing the map information to the mobile device. The map information can be used by the mobile device to display a map including a graphical representation of the location.

In one implementation, the method can further include receiving a request for route information from the mobile device for a route from a current location of the mobile device to the location, the request including the current location of the mobile device, and providing the route information to the mobile device. The route information can be used by the mobile device to display a map including a graphical representation of the route.

In general, in another aspect, the invention features a system including a processor and a storage device. The storage device is coupled to the processor and configurable for storing instructions, which, when executed by the processor, cause the processor to perform operations including receiving a request from a mobile device for map information, the request including a location wherein the location was derived by the mobile device from an associated calendar entry included in a calendar residing on the mobile device, and providing the map information to the mobile device. The map information can be used by the mobile device to display a map including a graphical representation of the location.

In one implementation, the instructions, when executed by the processor, further cause the processor to perform operations including receiving a request for route information from the mobile device for a route from a current location of the mobile device to the location, the request including the current location of the mobile device, and providing the route information to the mobile device. The route information can be used by the mobile device to display a map including a graphical representation of the route.

Implementations of the invention can realize one or more of the following advantages. A user of a mobile device including an integrated calendar/map feature benefits from intelligent calendar entries. That is, the feature can automatically provide the user warnings if he/she is going to be late for a next appointment, based on the location of the next appointment and distance from a current location of the mobile device (and therefore the user). The user can be automatically provided with map and route information at a relevant time, to facilitate the user in getting from one appointment to the next. With minimal or no effort on the user's part, an automated message can be sent to a person from the user advising on the status of their appointment, e.g., the user will be late, etc. A user's address book can also be integrated with the calendar and map features, providing additional relevant information to the user about his/her appointments scheduled throughout a day.

In another aspect, at least certain embodiments can provide an interface between a calendar software application and a map software application, and this interface may be an application program interface (API) between the calendar application and the map application. In one embodiment, first data, representing a first location and a second location, is provided from the calendar application to the map application through the interface, and the first location is one of a current location and a location of a first calendar entry having a first time, and the second location is a location of a second calendar entry having a second time which is after the first time.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Figure 1:
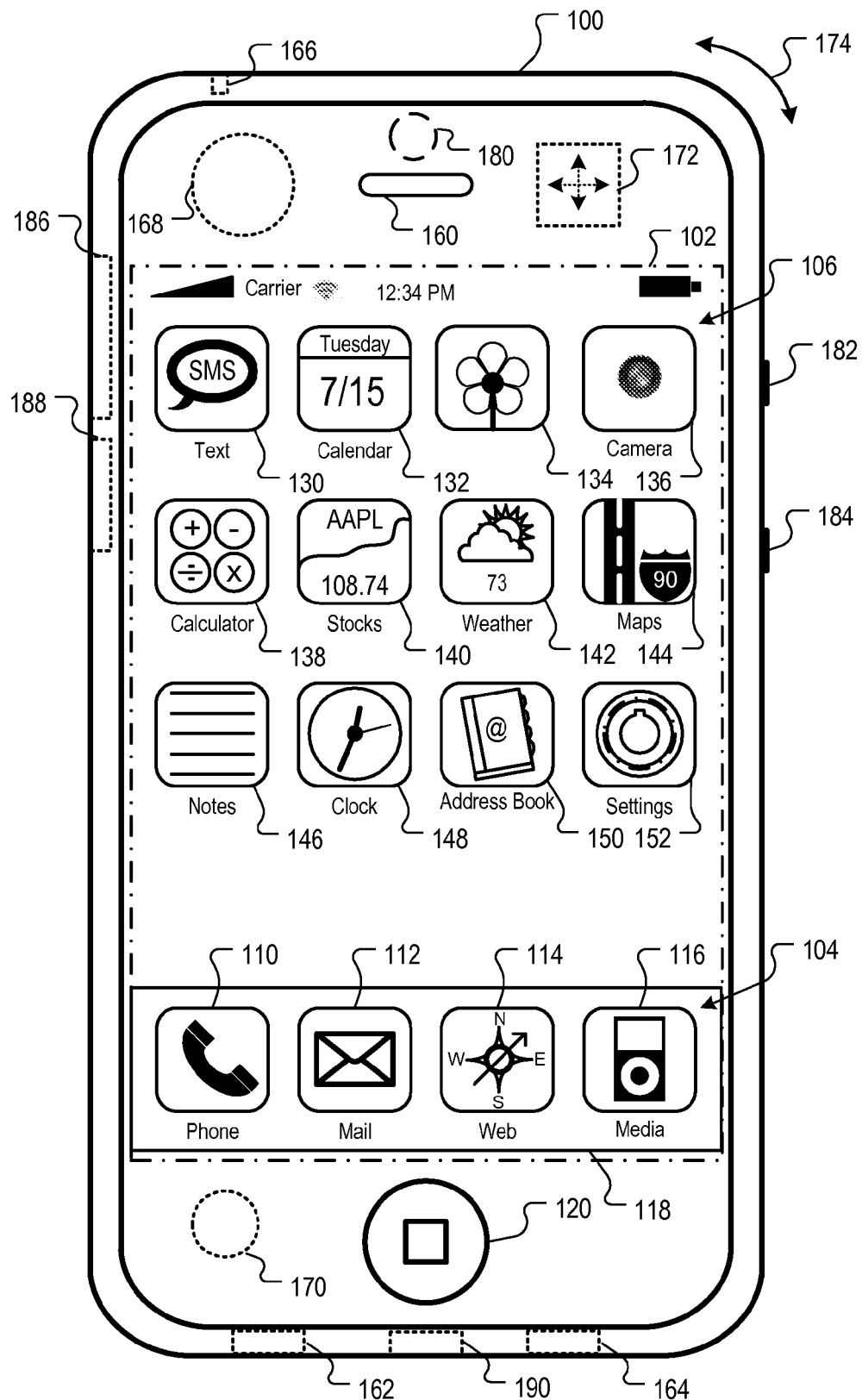
FIG. 1 is a block diagram of a mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which a point of contact is made using a stylus or other pointing device. An example of multi-touch sensitive display technology is described in U.S. Pat. Nos. 6,323,846; 6,570,557; 6,677,932; and U.S. Patent Publication No. 2002/10015024A1, each of which are incorporated by reference herein in its entirety.

In some implementations, the mobile device 100 can display one or more graphical user interfaces on the touch-sensitive display 102 for providing the user access to various system objects and for conveying information to the user to facilitate an intuitive user experience. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; and a media processing device, as indicated by the media player object 116. In some implementations, particular display objects 104, e.g., the phone object 110, the e-mail object 112, the Web object 114, and the media player object 116, can be displayed in a menu bar 118. In some implementations, each of the device functionalities can be accessed from a top-level graphical user interface, such as the graphical user interface illustrated in FIG. 1. Touching one of the objects 110, 112, 114 or 116 can, for example, invoke the corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., via Wi-Fi) to other wireless devices in the vicinity. For example, mobile device 100 can be configured as a base station for one or more devices. As such, mobile device 100 can grant or deny network access to other wireless devices.

In some implementations, upon invocation of particular device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102. The graphical user interface environment of FIG. 1 can be restored by touching the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS). In some implementations, a positioning system (e.g., a GPS receiver) can be integrated into the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, a personal computer, a printer, or other processing devices capable of receiving and/or transmitting data.

In some implementations, a port device 190, e.g., a USB port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP over USB protocol described in co-pending U.S. Provisional Patent Application No. 60/945,904, filed Jun. 22, 2007, titled "Multiplexed Data Stream Protocol," which patent application is incorporated by reference herein in its entirety.

Network Operating Environment

Figure 2:
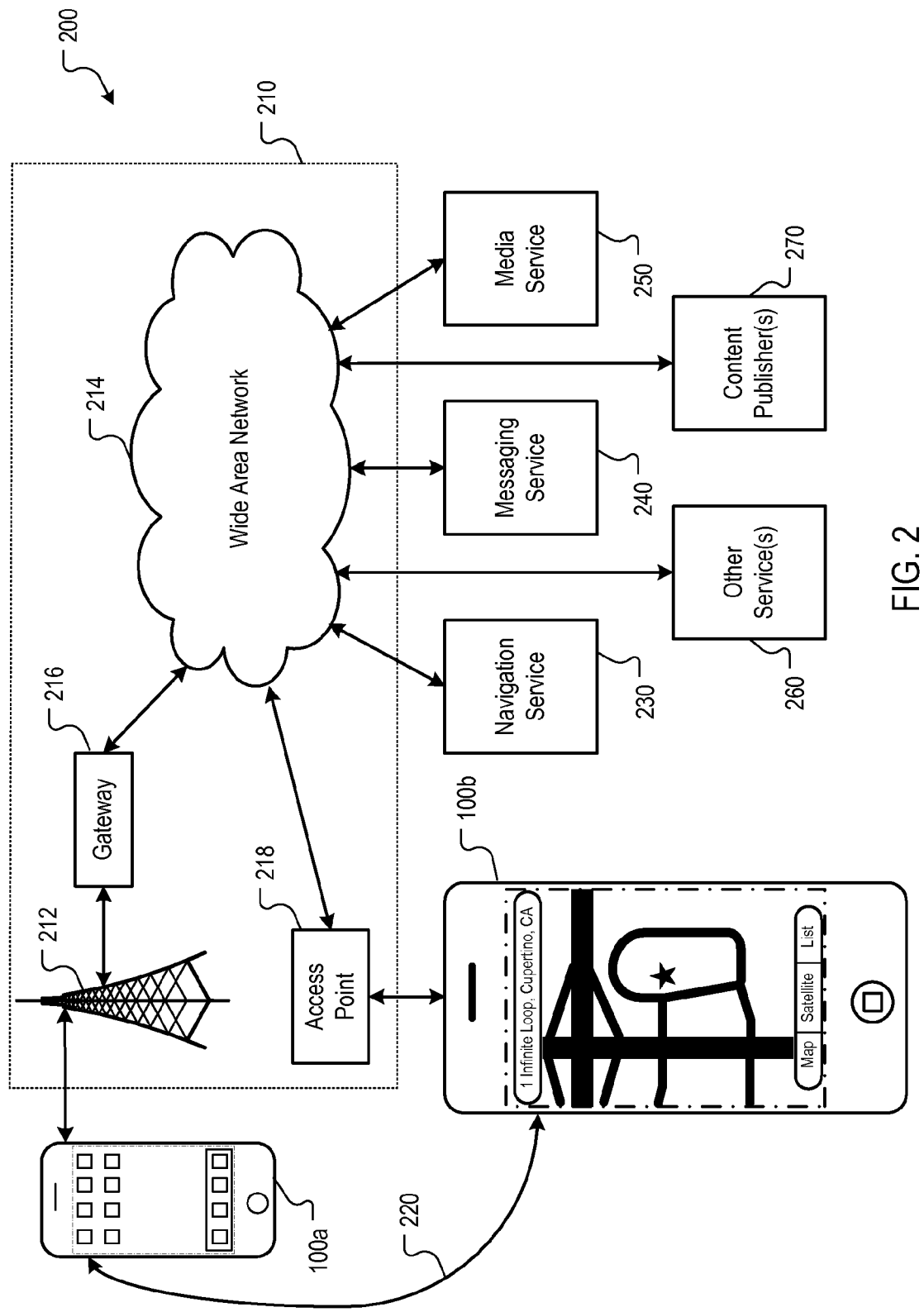
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250 and 260 and/or one or more content publishes 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100 (e.g., syncing services, software update services, activation services).

The mobile device 100 can also access other data and content over the one or more wired and/or wireless networks 210. For example, content publishers 260, such as news sites, RSS feeds, web sites, blogs, social networking sites, developer networks, etc. can be accessed by the mobile device 100. Such access can be provided by invocation of web browsing function or application (e.g., a browser) in response to a user touching the Web object 114.

Example Mobile Device Architecture

Figure 3:
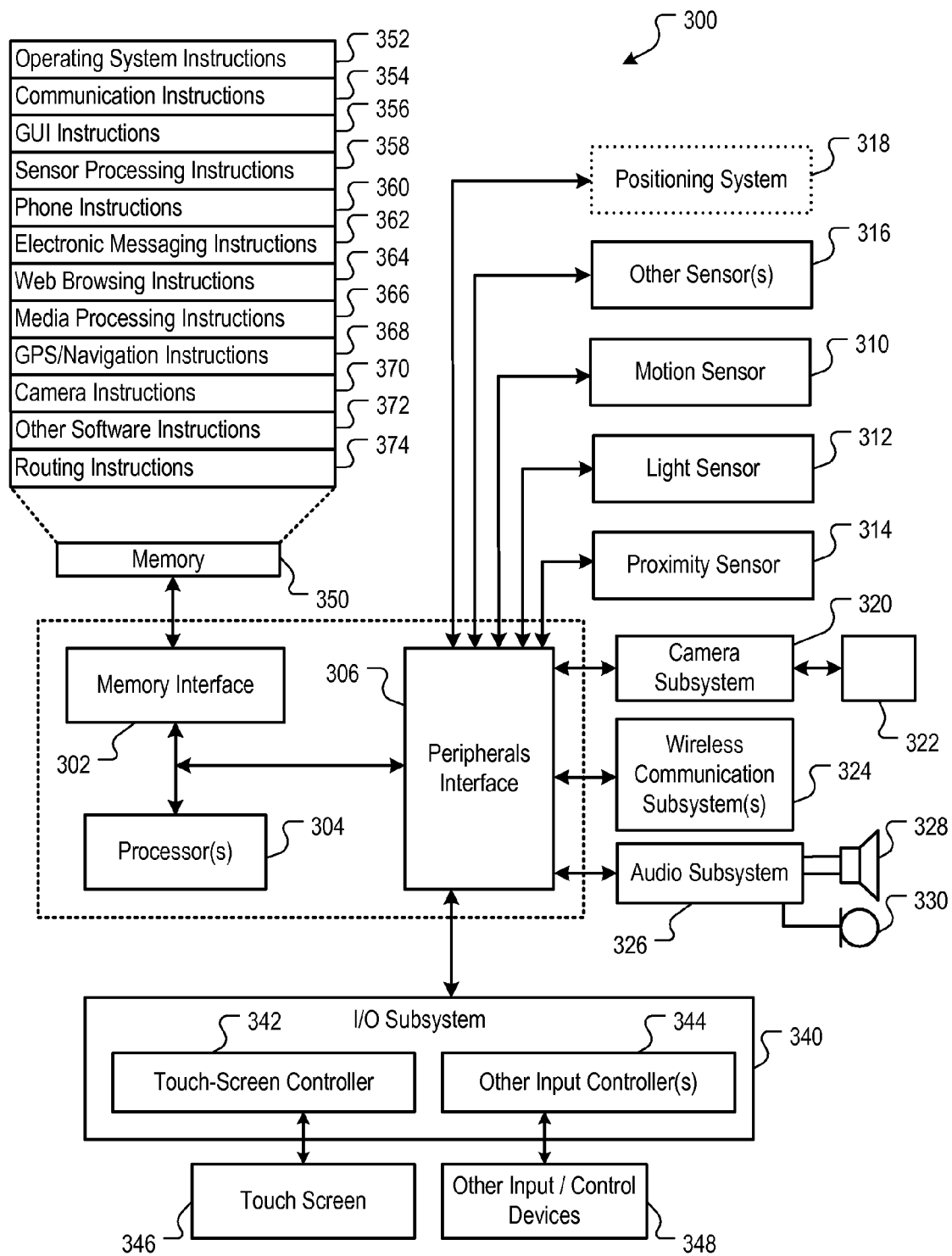
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302 one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., a GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network.

An audio subsystem 326 can be coupled to a speaker 328 and a microphone 330 to facilitate voice-enable functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 or data to facilitate other related processes and functions (e.g., security instructions, activation record).

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Integrated Calendar/Map Feature

A mobile device, e.g. mobile device 100 shown in FIG. 1, can provide multiple user applications, as discussed above. Two or more of the user applications can be integrated, to enhance the user's experience and provide improved functionality. In one implementation, the mobile device 100 provides a feature integrating a calendar application and map application, both of which are resident on and/or provided by the mobile device 100.

Figure 4:
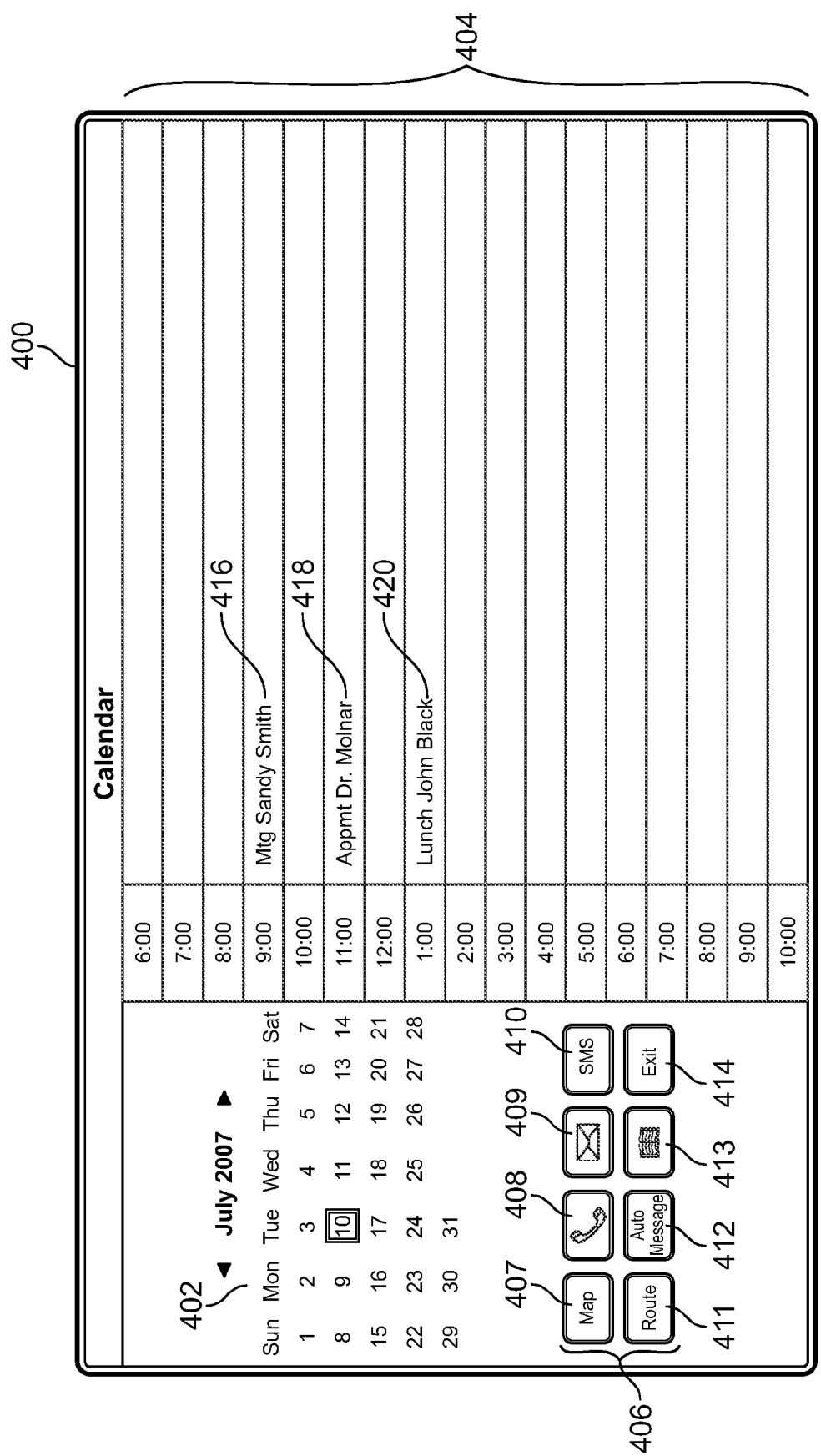
FIG. 4 is an example graphical user interface displaying a calendar.

By way of example, referring again to FIG. 1, the user of the mobile device can select the calendar display object 132 to invoke the calendar application. The calendar includes information about events on different dates in the calendar, including appointment information, notes and/or reminders. Referring to FIG. 4, an example graphical user interface 400 showing a page in a user's calendar is shown. The left portion of the page includes a monthly calendar view 402 with a certain date, i.e., Jul. 10, 2007, highlighted. The right portion of the page includes a daily view 404 for the corresponding date. The daily view 404 provides time slots where appointments or reminders can be input and displayed to the user. In a lower left portion of the page is a tool bar 406 including buttons 408-415, discussed further below.

For illustrative purposes, the integrated calendar/map feature is described using the example provided shown on the graphical user interface 400 in FIG. 4, and subsequent example graphical user interfaces shown in later figures. However, it should be understood that different configurations of graphical user interfaces can be used, and these are but some examples.

Referring again to the daily view 404, in this example the user has three calendar entries for Jul. 10, 2007. A first calendar entry 416 indicates a 9:00 meeting with Sandy Smith. A second calendar entry 418 indicates an 11:00 appointment with Dr. Molnar. A third calendar entry 420 indicates lunch with John Black. The map application provided by the mobile device 100 can be integrated with the calendar, such that a user can be provided a display of a map showing a location corresponding to a calendar entry. The location can be determined either from information provided by the user when inputting the calendar entry, or in another implementation by obtaining location information from an address book, as described further below.

The map can be displayed either automatically, e.g., at a predetermined time in relation to the calendar entry, or on demand, e.g., by the user selecting the map 407 button on the tool bar 406. For example, the user can input as a user-defined calendar setting a certain time period (e.g., 30 minutes) before a calendar entry time to be provided a map showing a location associated with the calendar entry, otherwise a default time can be used (e.g., 15 minutes prior to the calendar entry start time).

Figure 5:
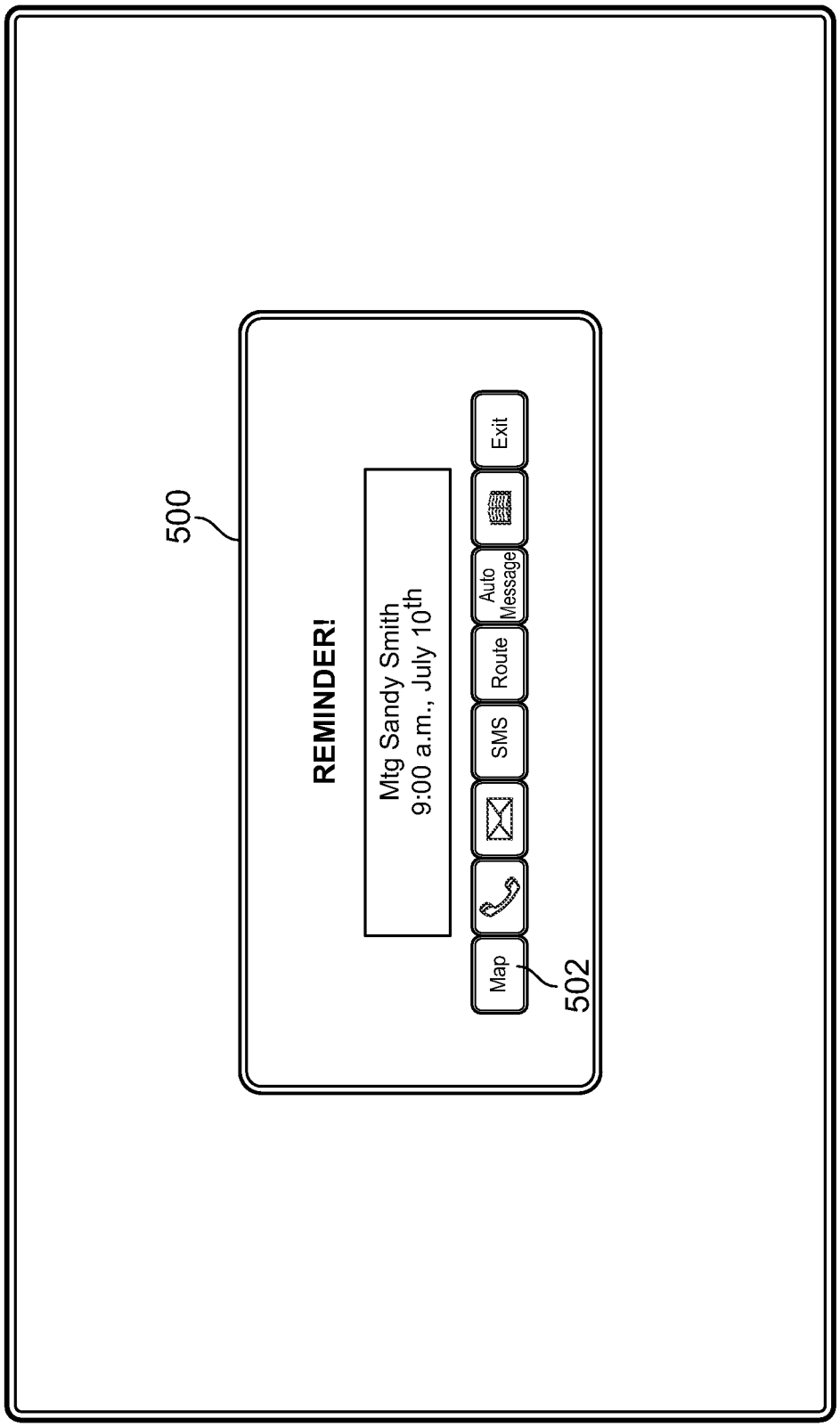
FIG. 5 is an example graphical user interface displaying a calendar entry reminder message.

In another implementation, at a predetermined time prior to a meeting, a reminder 500 is displayed to the user, as shown in FIG. 5. That is, as a user calendar setting, a user can input a time period before a calendar entry to be reminded of the calendar entry, otherwise, a default time can be used. In one example, the reminder 500 is superimposed on whatever image is displayed on a display at the time. The reminder 500 can indicate the calendar entry information and in one implementation, as shown, provide the buttons included in the tool bar 406 shown in the graphical user interface 400 of FIG. 4. A user can select the map button 502 to be provided a display of a map that includes an indication of a location corresponding to the calendar entry, i.e., the location of the meeting with Sandy Smith.

Figure 6:
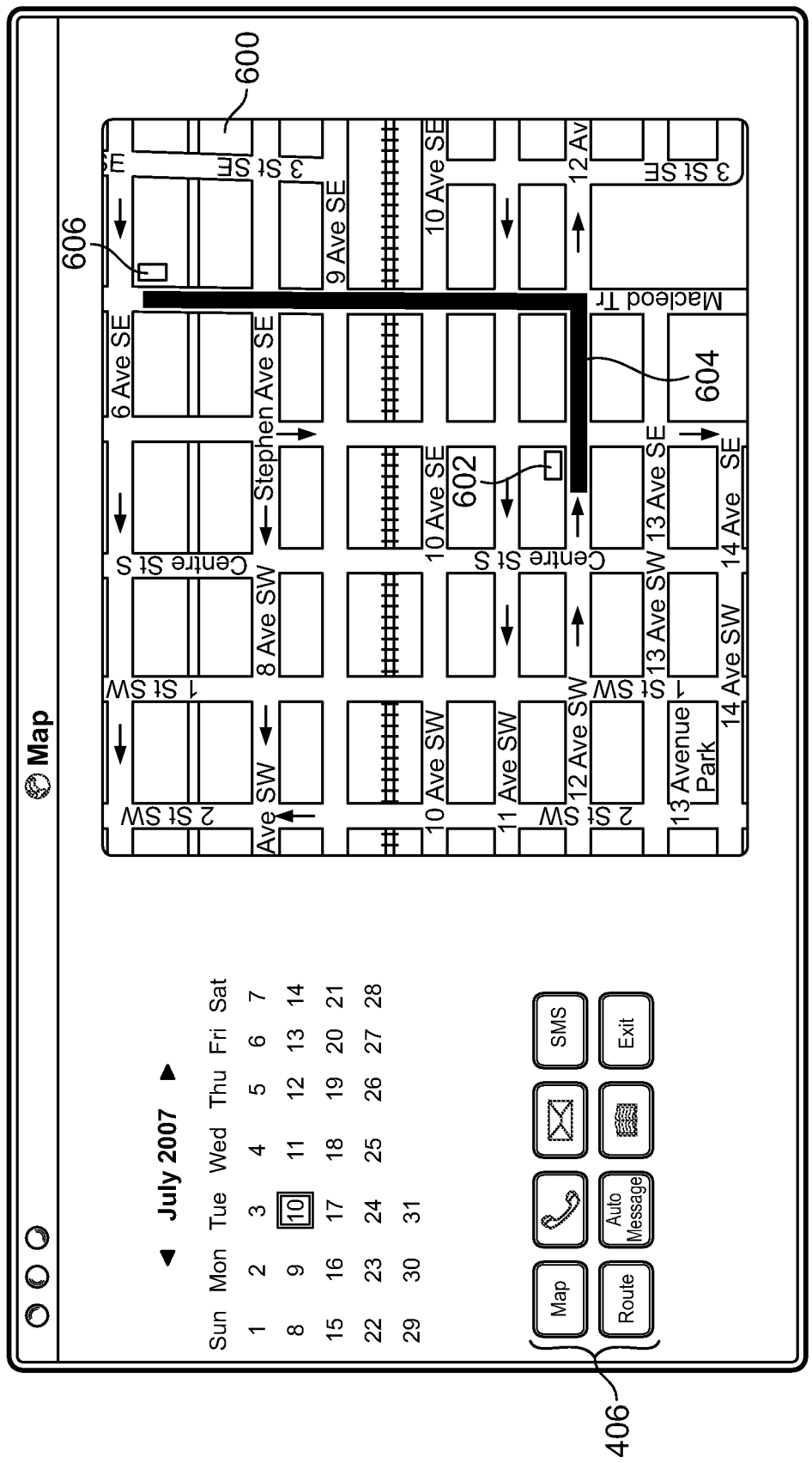
FIG. 6 is an example graphical user interface displaying a calendar and a map.

Referring to FIG. 6, for purposes of illustration, assume that in this example the user is already at the appointment with Dr. Molnar and the 1:00 lunch with John Black is upcoming. A map 600 is displayed that indicates a geographic location of the appointment with Dr. Molnar, i.e., marker 602 and a route 604 to a geographic location associated with the lunch with John Black, i.e., marker 606. In one implementation, at a predetermined time prior to the lunch with John Black, the integrated calendar/map feature automatically provides the map 600 to the user, such that the user is provided helpful information to travel seamlessly from one appointment to the next, with minimal user effort to retrieve the information.

In another implementation, the user can select the Dr. Molnar calendar entry 416 in the daily view 404 shown in FIG. 4, e.g., by highlighting the entry or touching the entry if the mobile device 100 has a multi-touch sensitive display, followed by a selection of the John Black calendar entry 418, followed by a selection of the route 411 button. A map is generated and displayed in response to the user selections to show a route 604 from a location 602 associated with the Dr. Molnar calendar entry and a location 606 associated with the John Black calendar entry 418. This implementation can be useful if a user would like to look at the route prior to either appointment, for example, the night before. That is, the user can be provided the map and route information on demand. The user can also be provided the map and route information automatically, as described above. For example, 30 minutes prior to the John Black lunch, the user can be automatically provided the map 600 shown in FIG. 6, indicating a route from the Dr. Molnar appointment to the John Black lunch. It should be noted that other manners of interacting with a user interface, including the user input required and/or the order of the user input is possible, and the steps described are examples only for illustrative purposes.

Figure 7A:
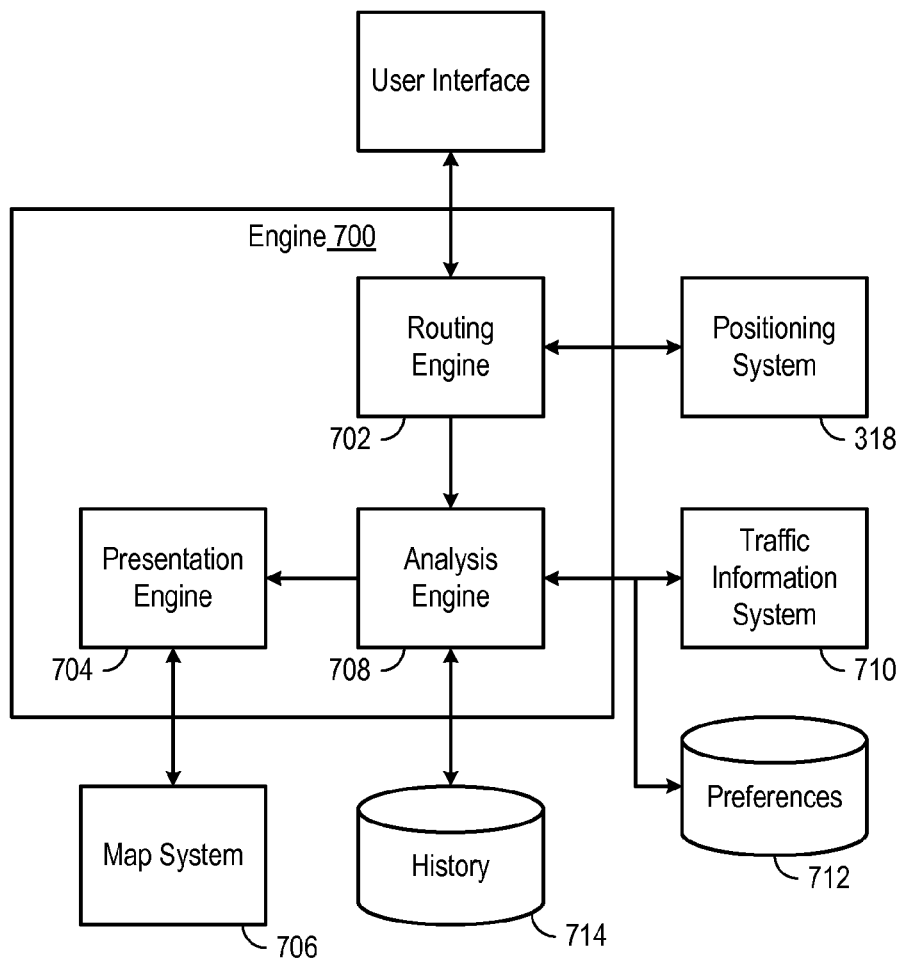
FIG. 7A is a block diagram representing example an engine.

FIG. 7A is a block diagram illustrating an example operation of an engine 700 (e.g., embodied in the routing instructions 374 shown in FIG. 2). In some implementations, the engine 700 can include a routing engine 702, a presentation engine 704 and an analysis engine 708. In one implementation, the routing engine 702 can derive a route between two locations using existing routing technology. By way of illustration, Google Maps API is one example of existing routing technology, available from Google, Inc. (Mt. View Calif.). The routing engine 702 provides a route between the two locations to the presentation engine 704. The presentation engine 704 can communicate with a map application 710 (i.e., the map application used in the integrated calendar/map feature). The presentation engine 704 can use a map provided by the map application 706 to overlay the route information. Referring again to FIG. 6, the map 600 is shown with a route 604 superimposed thereon. The map can be obtained by the map application 706 from an external map service, e.g., Google Maps API.

In order for the integrated calendar/map feature to provide a map including geographic locations and optionally a route, a location associated with a calendar entry must be known or determinable. In one implementation, the integrated calendar/map feature is further integrated with an address book residing on (or accessible by) the mobile device. The address book includes a set of contacts, where contact information is included for each contact. For example, the contact information can include a person or entity's name, address, phone number, email address, and/or other information related to the person or entity. The address book can reside on the mobile device 100, or be stored externally but accessible by the mobile device 100. To determine an address associated with a calendar entry, the address book can be searched for a contact corresponding to a person or entity named in the calendar entry. If a corresponding contact is located, an address included in the contact information for the contact in the address book can be used when generating a display of map and route information. However, the address included in the contact information is not necessarily the address corresponding to the calendar entry. For example, if the lunch appointment with John Black is at a restaurant rather than at his home address, then retrieving Mr. Black's home address from his contact information is not helpful.

Figure 8:
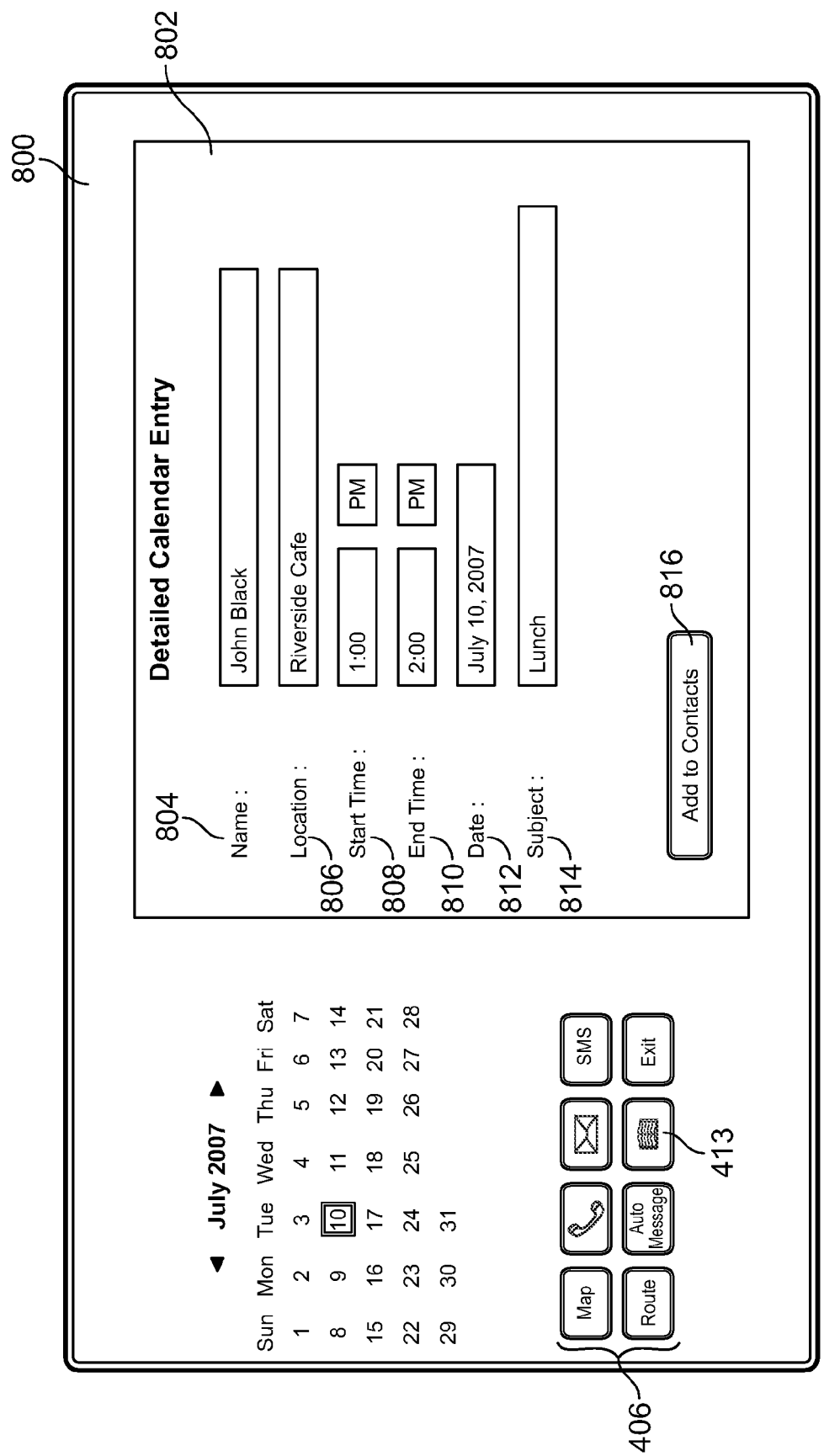
FIG. 8 is an example graphical user interface displaying a detailed calendar entry.

Referring now to FIG. 8, an example graphical user interface 800 showing a detailed calendar entry view 802 is shown. For example, if the user selected the John Black calendar entry 418 shown in FIG. 4, the detailed calendar entry view 802 can be presented to the user in response. The detailed calendar entry view 802 includes the name 804 of the person or entity to whom the calendar entry pertains, i.e., John Black. A location 806 corresponding to the calendar entry is also included, i.e., Riverside Café. In this example, the location of the lunch with John Black in fact is not at his home, but is at a restaurant. Start and end times 808, 810 for the appointment are shown along with the date 812. A subject field 814 is provided, where a user can optionally provide a brief description relating to the calendar entry, e.g., lunch.

In one implementation, if John Black is not already included in the user's address book, the user can select the "add to contacts" button 816 and a graphical interface can be presented to the user to prompt the user for input to include in the contact information for John Black. In another implementation, the user can select the location associated with the calendar entry, e.g., Riverside Café, and add the location into the user's address book. In some implementations, if John Black is included in the user's address book, as soon as the user inputs the name John Black into the name field 804, the location field 806 can automatically populate with John Black's address retrieved from the address book. The user can then optionally revise the location, for example, to change to a restaurant location.

Figure 9:
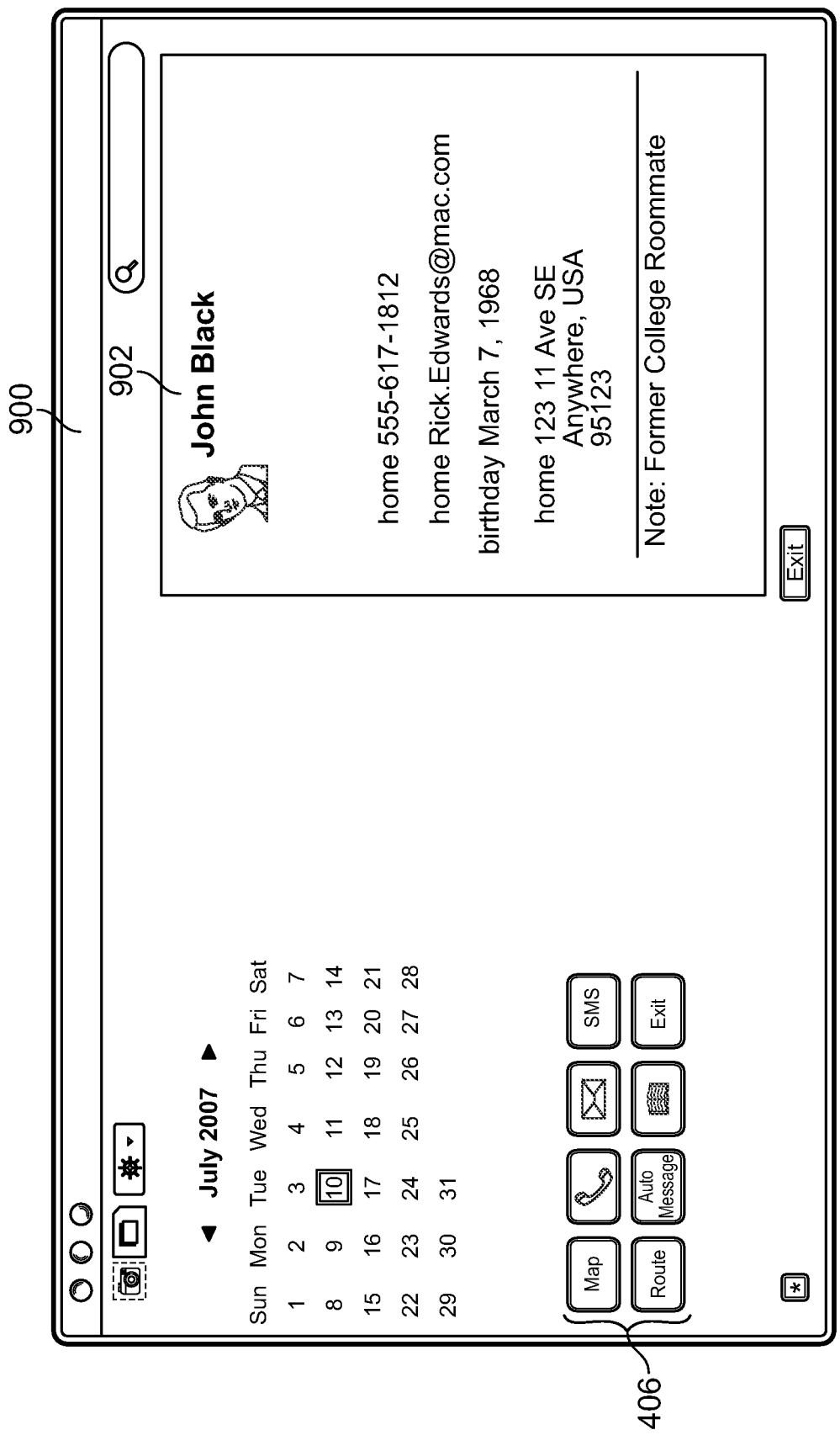
FIG. 9 is an example graphical user interface displaying a calendar and contact information from an address book.

In the example tool bar 406 shown in FIG. 8, an address book button 413 is shown. A user can select the address book button 413 to view contact information associated with John Black. Referring to FIG. 9, an example graphical user interface 900 is shown. The detailed calendar entry view 802 is replaced with a display of contact information 902 corresponding to John Black, which was retrieved from the address book. In this example, the contact information includes a telephone number, email address, birthday, address, and note. A user can exit this view by selecting the exit button 904 (e.g., to return to a previous view) or by selecting a button on the tool bar 406.

As discussed above, the location associated with a calendar entry must be known or determinable for the map and/or route information to be provided. In this particular example, the location for the John Black calendar entry is retrieved from the detailed calendar entry information, that is shown in FIG. 8. The user input this information was inputting this particular calendar entry into his calendar. The location is "Riverside Café". The integrated calendar/map feature can either retrieve an address for the Riverside Café from the user's address book, if the Riverside Café is included therein, or query a directory, e.g., the Yellowpages online, to determine an address. Other techniques can be used to determine an associated address. In one implementation, the user is prompted to provide the address, either when inputting the detailed calendar entry or at a later time.

Figure 10:
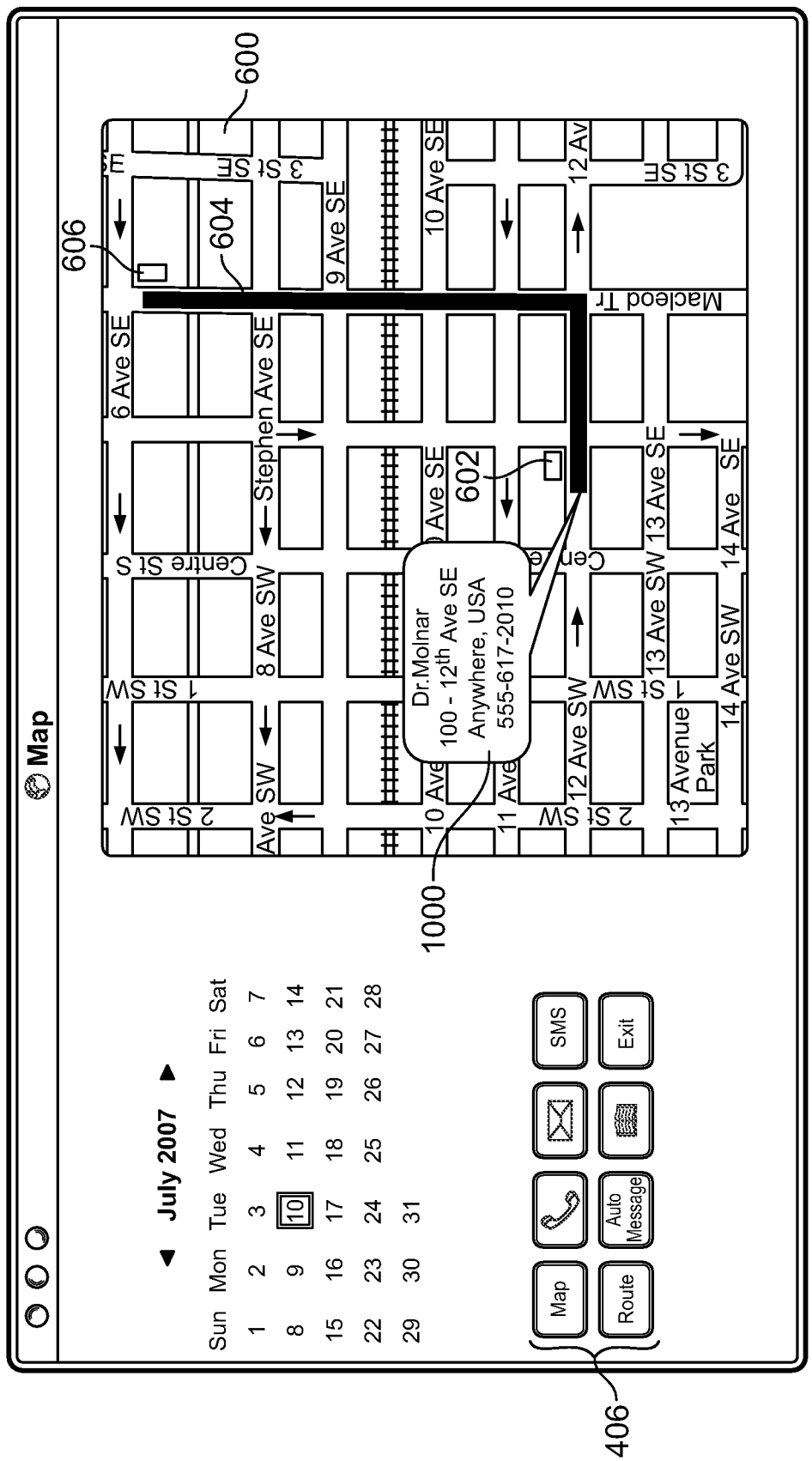
FIG. 10 is an example graphical user interface displaying a map and a route superimposed thereon.

Referring to FIG. 10, the map 600 is shown with the route 604 between the Dr. Molnar appointment at location 602 and the John Black lunch at location 606 superimposed thereon. Additionally, in this example, in response to a user interaction an information balloon 1000 is shown that includes contact information for Dr. Molnar. For example, if the mobile device 100 includes a multi-touch sensitive display, a user can briefly touch the location 602 representing the Dr. Molnar appointment and the information balloon 1000 is displayed in response. In this example, Dr. Molnar is a contact included in the user's address book, and at least some contact information corresponding to Dr. Molnar is presented to the user in the information balloon 1000.

In another implementation, in response to a user selecting the location 602, an information balloon is provided that includes information retrieved from the detailed calendar entry corresponding to the selected location 602, for example, indicating the start and end times of the appointment. Other manners of providing contact information and detailed calendar entry information to a user in response to a user interaction with the map 600 are possible, and the ones described are some examples.

Figure 11:
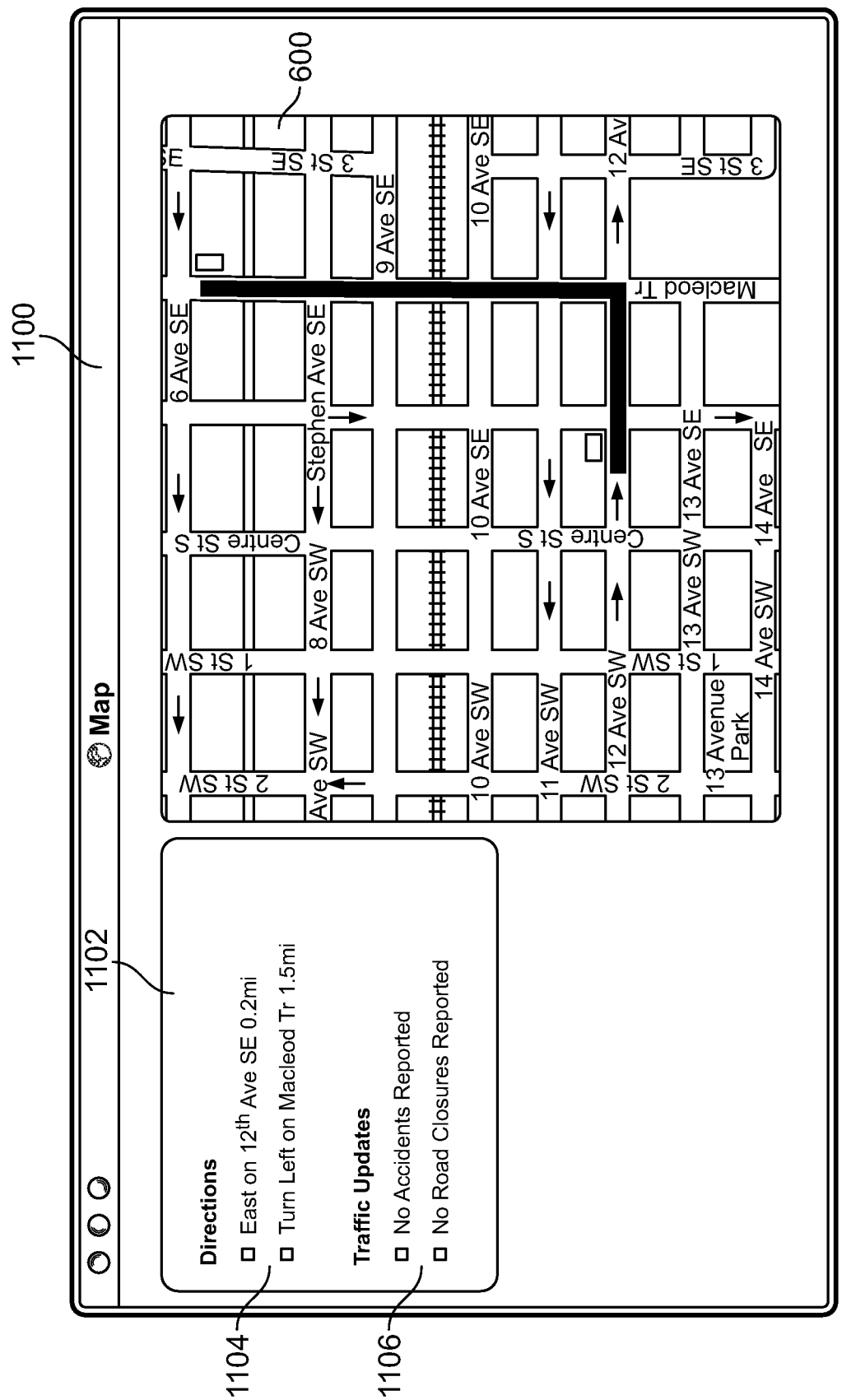
FIG. 11 is an example graphical user interface displaying a map, route, driving directions and traffic update information.

Referring to FIG. 11, in one implementation, route information can include textual directions in addition to a route superimposed on a map. FIG. 11 shows an example graphical user interface 1100 including the map 600 and text box 1102; the text box 1102 includes directions 1104.

In one implementation, in addition to directions, the user can be provided traffic information, for example, the traffic updates 1106 shown in the text box 1102. For example, the routing engine 702 (referring again to FIG. 7) can receive obtain traffic information for either streets included within the route 604 or for all streets within a certain radius of the start and end locations of the route, i.e., in this example locations 602 and 606. The traffic information obtained, for example, from an external traffic feed, i.e., traffic information system 710, in communication with an analysis engine 708 included in the engine 700, can be displayed as shown at 1106 in FIG. 11.

In another implementation, the routing engine 702 can be intelligent, in the sense that alternative routes between the same two locations are obtained and analyzed to determine a suggested best route, taking into account factors, such as current or historical traffic conditions. An intelligent routing system is described in further detail in U.S. application Ser. No. 12/020,073, filed on Jan. 25, 2008, by Forstall et al, entitled "Intelligent Route Guidance", the entire contents of which are hereby incorporated herein by reference.

Referring again to FIG. 7A, the engine 700 can optionally include an analysis engine 708. The routing engine 702 can communicate one or more derived routes to the analysis engine 708. The analysis engine 708 can analyze the one or more routes received from the routing engine 702. In some implementations, the one or more routes can be analyzed based on traffic information received from the traffic information system 710. Based on the complexity of a route, the route can include many route progressions. Route progressions, in some implementations, include a discrete lengths of road that together form a route.

Figure 7B:
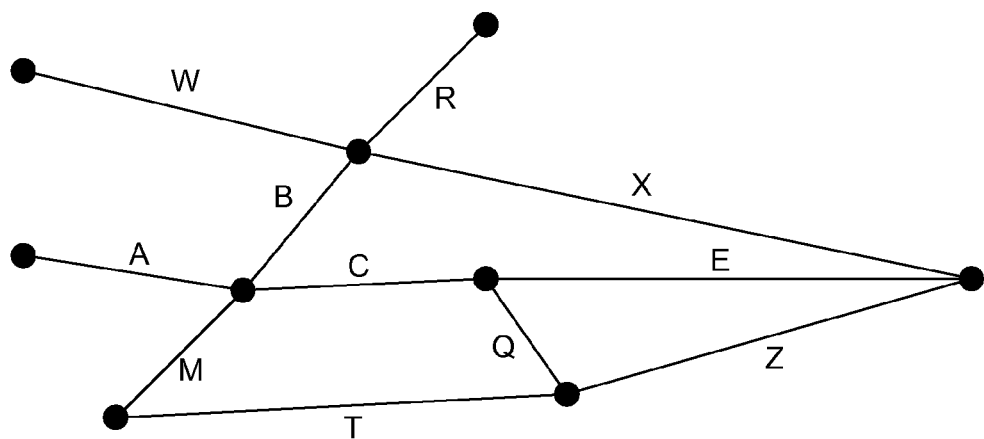
FIG. 7B is a schematic representation of route progressions.

In some implementations, the traffic information can be retrieved based upon the route progressions associated with the one or more routes. For example, FIG. 7B is a block diagram of route progressions. In the example of FIG. 7B, a first route includes progressions A, B and X, a second route includes progressions A, C, Q and Z, and a third route includes progressions A, C and E. However, route progressions M, T, R and W are not included in any of the routes. In one implementation, the analysis engine 708 can send a request for traffic information associated with only route progressions A, B, C, Q, X and Z to the traffic information system 710, while omitting route progressions M, T, R and W because those route progressions are not included in any of the identified routes.

In other implementations, the traffic information sent to a mobile device (e.g., mobile device 100 of FIG. 1) can include all available traffic information related to local roads. In such implementations, a traffic signal can include many component parts (e.g., one for each available road), and the traffic information for the various roads can be encoded into the signal (e.g., using time division, code division, frequency division, etc.). Thus, the analysis engine 710 can parse (e.g., decode, demultiplex, etc.) the signal to obtain traffic information for a desired route progression. Thus, the mobile device might receive traffic information associated with route progressions A through Z (e.g., A, B, C, M, R, T, W, Q, X and Z). Based on the previous example, the analysis engine 708 can parse the traffic information to retrieve traffic related to route progressions A, B, C, Q, X and Z.

In some implementations, the one or more routes can be analyzed based upon user preferences retrieved from a preference data store 712. User preference data, for example, can indicate a user preference for types of roads, distance, traffic, traffic control devices (e.g., traffic lights, stop signs, rotaries, etc.), time, preferred routes, neighborhoods, etc. In some embodiments, the analysis engine can use such preferences to select among the one or more routes provided by the routing engine.

In further implementations, the analysis engine 708 can analyze one or more routes based upon historical data. For example, historical data can include information about the average time associated with navigating a route progression, and in one implementation is stored in history database 714. The average time associated with a number of route progressions included in a route can combined to provide an estimated total time to navigate the route. The route may then be compared to similarly analyzed routes based on estimated total time to navigate the other routes, which can be used to recommend a route to a user.

In some implementations, the average time to navigate a route progression can be dependent upon the time of day the route progression is being navigated. For example, a section of highway in a large city may be slow at 8:00 am due to rush hour, while the same section of highway might be clear at 10:00 pm. Thus, the historical data can include a time of day for which the average is to be computed. For example, the analysis engine 708 can average the five navigations taken at the closest times of day to the corresponding calendar entry time, e.g., the 1:00 lunch with John Black. In further implementations, recentness of a navigation can be factored in to the estimation of navigation time. For example, the five most recent navigations of a road may be used to calculate an estimated navigation time associated with the route progression. In other implementations, any of these factors can be combined. For example, the time of day can be balanced with the recency of a navigation to produce the five most recent navigations, which are closest in time of day to the calendar entry time.

The analysis engine 708 can provide one or more recommended routes to the presentation engine 704. The presentation engine 704 can communicate with the map application 706. In some implementations, the map application can be provided, for example, by a navigation service (e.g., navigation service 230 of FIG. 2). In other implementations, the map application 706 can be provided by a map store residing on the mobile device (e.g., mobile device 100 of FIG. 1). The presentation engine 704 can use the map provided by the map application 706 to overlay the route information. In examples where multiple routes are provided to the user, the presentation engine 704 can receive a route preference from the user and display the preferred route.

In one implementation, the mobile device 100 is location aware (i.e., can determine its current location). Referring again to FIG. 3, in this implementation, the mobile device 100 includes a positioning system 318. In various implementations, the positioning system 318 can be provided by a separate device coupled to the mobile device 100, or can be provided internal to the mobile device. In some implementations, the positioning system 318 can employ positioning technology including a GPS, a cellular grid, television signals, Wi-Fi base stations, URIs or any other technology for determining the geographic location of a device. In other implementations, the positioning system 318 can be provided by an accelerometer and a compass using dead reckoning techniques. In such implementations, the user can occasionally reset the positioning system by marking the mobile device's presence at a known location (e.g., a landmark or intersection). In other implementations, the positioning system 318 can be provided by using wireless signal strength and one or more locations of known wireless signal sources to provide the current location. Wireless signal sources can include access points and/or cellular towers. Other techniques to determine a current location of the mobile device 100 can be used and other configurations of the positioning system 318 are possible.

If the mobile device is location aware, as described, then in some implementations, the engine 700 can continue to analyze a current route to monitor for changing conditions. For example, an accident between the start of navigation of a route and the end of navigation of the route can change the analysis associated with recommending the current route. In such situations, the engine 700 using the routing engine 702 and analysis engine 708 can calculate estimated navigation times associated with alternative routes. In some implementations, the engine 700 can automatically communicate a new route to the user through the presentation engine 704. Such automatic rerouting can be provided to the user with notification of the change or without notification of the change to the user. In other implementations, the engine 700 can present the estimated navigation times associated with alternative routes to the user through the presentation engine 704. The user can then choose an alternative route based upon the estimated navigation times. The user's choice, in various implementations, can be indicated by selecting a route using an I/O device (e.g., touch screen 346 of FIG. 3), or by navigating one of the alternative routes, among others.

Additionally, if the mobile device is location aware, the user can be provided map and route information displaying a route superimposed on the map from the current location of the mobile device (i.e., the user) to a location associated with an upcoming calendar entry. In one implementation, the positioning system 318 can communicate a current location of the mobile device to the routing engine 702.

In one implementation, the route information can include either in addition to the route displayed on the map, or instead of the route displayed on the map, an audio file including audio directions from the current location of the mobile device 100 to the contact location. The audio file can be delivered to a voicemail application provided by the mobile device. In one implementation, the audio file includes chapter marks such that the user can play back the voicemail while traveling the route to the contact location, and pause at the chapter marks while progressing along the route from one instruction to the next. In another implementation, the audio file is included in a podcast delivered to the mobile device 100 over the Internet. The audio file included in the podcast may also include chapter marks to facilitate playback of the route information while progressing along the route. In an implementation where the audio file is provided in conjunction with the route displayed on a map, the mobile device's current location as the mobile device progresses along the route can be tracked on the map in sync with the directions being provided by audio to the user.

Referring again to FIG. 4, the buttons 407-415 included in the tool bar 406 shall be described further. The map button 407 has been discussed above. That is, a user can select a calendar entry from the daily view 404 and select the map button 407 for a display of a map including an indication of a geographic location associated with the calendar entry. The route button 411 can be selected by the user to provide a route superimposed on the map between two calendar entries, as described above, and/or other route information, for example, textual or audio directions or traffic updates. Alternatively, the user can request a route from a current location of the mobile device to a location associated with a calendar entry.

The telephony button 408 can be selected by the user to automatically initiate a telephone call to a person or entity associated with a selected calendar entry, in implementations where the mobile device includes a telephony application. For example, if the user selects the John Black calendar entry 418 and selects the telephony button 408, John Black's telephone number can be automatically retrieved from his corresponding contact information included in the user's address book and a telephone call to the telephone number automatically initiated. If more than one telephone number are included in John Black's contact information, the user may be prompted to choose which number, or a default number may be automatically selected.

The email button 409 can be selected by the user to automatically initiate an email message to a person or entity associated with a selected calendar entry, in implementations where the mobile device includes an email application. For example, if the user selects the John Black calendar entry 418 and selects the email button 409, an empty email message addressed to John Black's email address retrieved from his contact information included in the user's address book can be automatically prepared and presented to the user.

In another implementation, where the mobile device includes a short messaging service (SMS) application, the SMS button 410 can be selected by the user to automatically initiate an SMS message to a person or entity associated with a selected calendar entry. The telephony button 40S, email button 409 and SMS button 410 can be helpful to the user, for example, if the user would like to confirm or reschedule an appointment the user has noticed in his or her calendar, or if the user is running behind or ahead of schedule.

To further assist the user in this regard, an auto message button 412 is included in the implementation shown. The auto message button 412 can be selected by the user to automatically send a preset message to a person or entity associated with a selected calendar entry. The preset message can be set by the user in his/her settings, or can be a default message provided by the integrated calendar/map feature. By way of illustrative example, the preset message may always read "User Smith is behind schedule but intends to make your appointment. Please telephone User Smith at 555-1234 if you must reschedule". Therefore, if the user is running behind schedule, and perhaps driving in his/her vehicle, the user can send such a message at the touch of a single button. The user can select in the user's settings in advance the preferred mode of delivering an auto-message, i.e., by telephone, email or SMS to name some examples.

Figure 12:
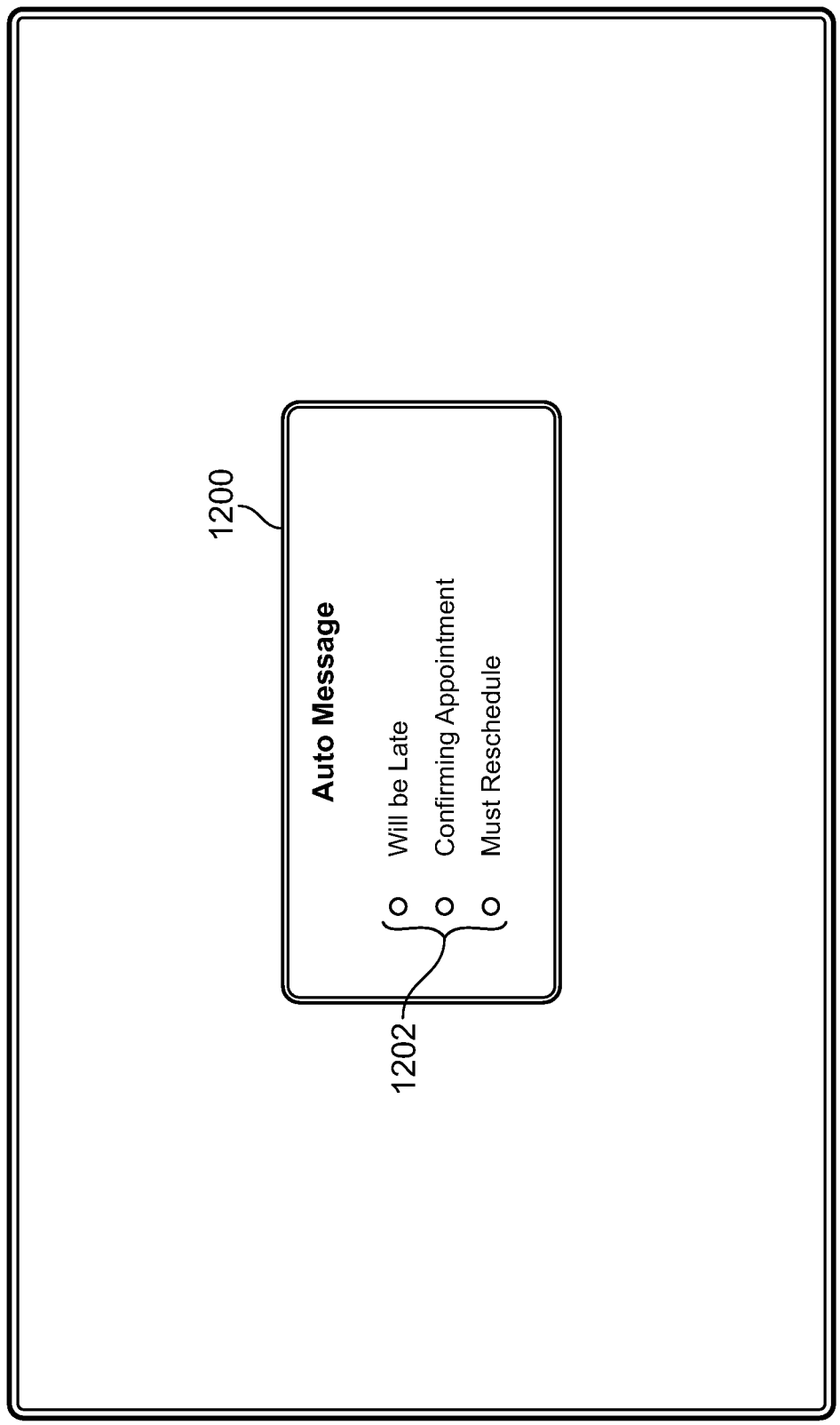
FIG. 12 is an example graphical user interface displaying an auto message dialog box.

Referring to FIG. 12, in one implementation, upon selecting the auto message button 412, the user is presented a dialog box 1202 as shown on the example graphical user interface 1200. The dialog box 1202 presents the user with options as to the content of the message. In this example, the message can either indicate the user will be late, the user is confirming the appointment or the user must reschedule the appointment. The user is provided controls, in this example radio boxes, the user can activate to select an appropriate message. Other configurations of a prompt mechanism can be used, and the dialog box 1202 and content therein is but one example for illustrative purposes.

Referring to the illustrative example discussed above, if the appointment with Dr. Molnar is a dental appointment and the user is sitting in dental chair at 12:45 and realizes he/she will be late for the 1:00 lunch with John Black, with the touch of the auto-message button 412, the user can quickly send a message to John Black advising that he/she will be late, without have to actually speak into a telephone or key in an email or SMS message.

As a further advantage, the user may be aware that he/she will likely be late due to an alarm provided by the mobile device. That is, in one implementation, the mobile device is location aware and can determine the current location of the mobile device relative to a geographic location associated with an upcoming calendar entry. The mobile device, by way of the routing engine 702 described above, can be aware that it will take the user approximately 30 minutes to travel from the current location to the restaurant at which the user is scheduled to meet John Black. At a predetermined time prior to 12:30 (i.e., 30 minutes before the lunch meeting), the user can begin receiving alarms that he/she will likely be late for the appointment. Upon receipt of such an alarm, the user can select to send the auto-message indicating he/she will be late or must reschedule the appointment. In the current example, the user may be given a first alarm at 12:15 followed by a second alarm at 12:30 and a third alarm at 12:45, if the user is still more than 15 minutes away from the restaurant location.

Referring again to the tool bar 406 of FIG. 4, the address book button 413 was discussed above. The user can select a calendar entry from the daily view 404 and select the address book button 413 to view contact information corresponding to a person or entity associated with the calendar entry, if contact information for the person or entity is included in the user's address book. If not, then in one implementation the user can be asked whether they would like to create a contact entry for the person or entity in their address book, and if so, be prompted for the necessary user input to create the contact entry.

The exit button 414 can be selected by the user to exit the calendar view and navigate between graphical user interfaces.

In another implementation, the user can select to map and/or route all calendar entries for a day at once. For example, if the user would like to view the routes he/she would be taking on a certain day based on his/her schedule that day, all geographic locations and routes therebetween for calendar entries scheduled that day can be shown in a single map display. The user may determine, by the visual display of the routes, that his her day could be much more efficient if certain appointments were switched around.

Figure 13:
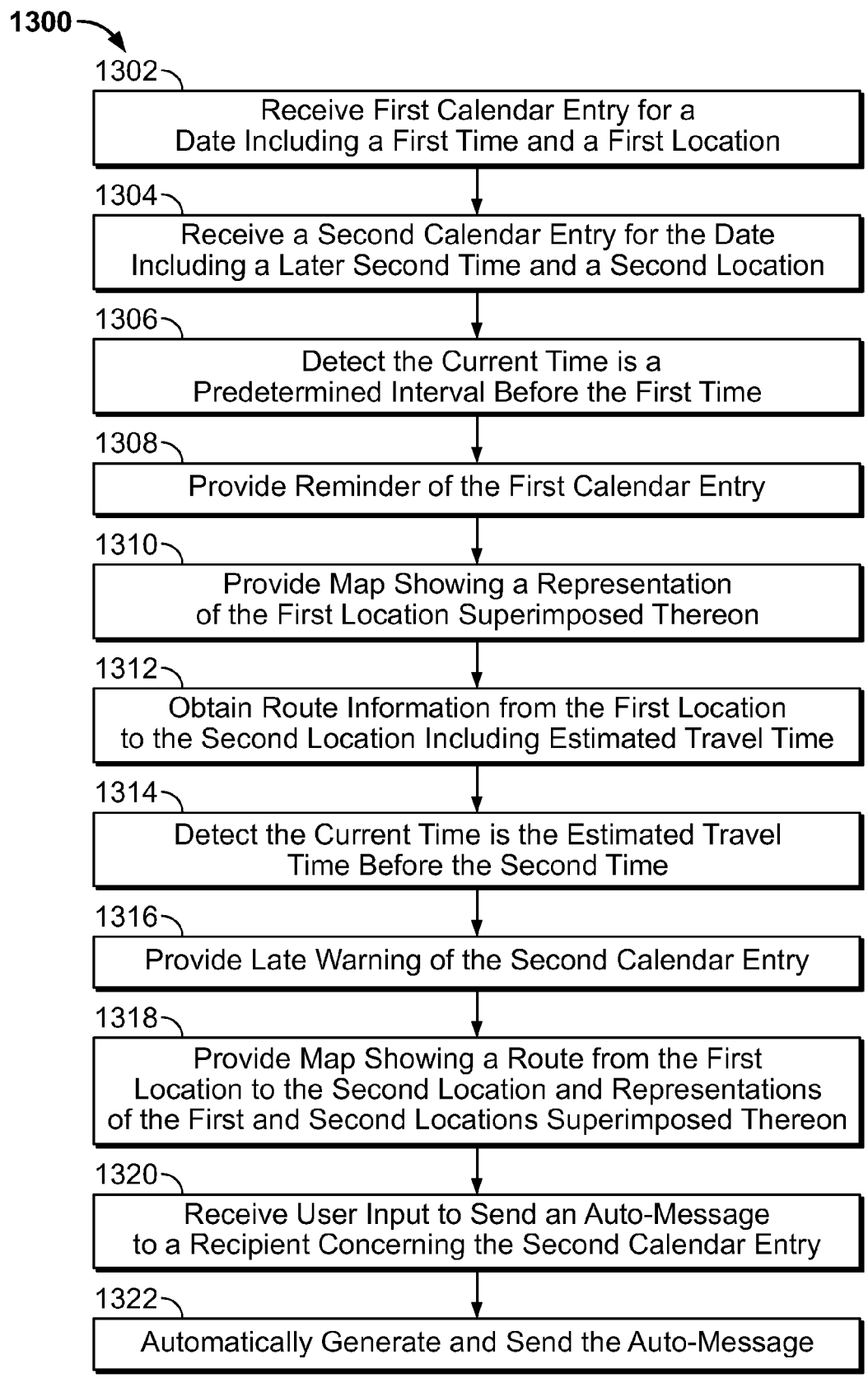
FIG. 13 is a flowchart showing an example process of the integrated calendar/map feature.

Referring now to FIG. 13, an example process 1300 is shown illustrating the integrated calendar/map feature. A first calendar entry for a date is received including a first time and a first location (Step 1302). A second calendar entry for the same date is received including a later second time and a second location (Step 1304). For clarity, a calendar entry being "received" can be a calendar entry received by way of user input into the mobile device providing the integrated calendar/map feature. In another example, a calendar entry being received can be a calendar entry received by the calendar from an automated meeting maker type of application. In yet another example, a re-occurring meeting can be scheduled by a user of the mobile device or by a third party (e.g., using an automated meeting maker application initiating from an external device in communication with the mobile device), and the re-occurring meeting can be automatically represented by a series of calendar entries added to the calendar.

Referring again to FIG. 13, a detection is made that a first current time is a predetermined interval before the first time associated with the first calendar entry (Step 1306). For example, if the first time is 9:00 am and the predetermined interval is 30 minutes, then at 8:30 am there is a detection that the current time is the predetermined interval before the first time. A reminder is provided of the first calendar entry (Step 1308). That is, in one example, the user can set the predetermined interval as 30 minutes if the user desires a reminder of his/her calendar entries 30 minutes in advance of a time associated with the calendar entries. A map is provided showing thereon a representation of the first location (Step 1310).

The second calendar entry is at a second later time. Route information is obtained including a route from the first location to the second location, and including an estimated travel time (Step 1312). A detection that a second current time (i.e., a later time than the first current time) is the estimated travel time before the second time associated with the second calendar entry is made (Step 1314). For example, if the second time is 1:00 pm, and the estimated travel time between the first calendar entry and the second calendar entry is 45 minutes, then at 12:15 pm a detection is made that the current time is the estimated travel time before the second time. A late warning is provided of the second calendar entry (Step 1316). That is, upon detecting that the second time is only 45 minutes away, and the estimated travel time is 45 minutes, a late warning is provided to alarm a user that they may be late for the second calendar entry.

A map is provided showing the route from the first location to the second location and includes representations of the first and second locations superimposed thereon (Step 1318). A user input is received to send an auto-message to a recipient concerning the second calendar entry (Step 1320). For example, in response to receiving the late warning, the user may decide to send a message to the recipient (associated with the second calendar entry) advising that the user will be late or requesting to reschedule their appointment. The auto-message is automatically generated and sent to the recipient in response to the user's instruction (Step 1322).

The steps in the process 1300 can be performed in a different order and some steps are optional. The particular steps described are illustrative of an example to further explain the advantages of the integrated calendar/map feature.

An engine, as the term is used throughout this application, can be a piece of hardware that encapsulates a function, can be firmware or can be a software application. An engine can perform one or more functions, and one piece of hardware, firmware or software can perform the functions of more than one of the engines described herein. Similarly, more than one piece of hardware, firmware and/or software can be used to perform the function of a single engine described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   storing a first calendar entry in a calendar, where the first calendar entry includes a first associated time and a first associated location;
   storing a second calendar entry in the calendar, where the second calendar entry includes a second associated time and a second associated location;
   displaying, at a predetermined time before the second associated time and after the first associated time has passed, in a graphical user interface with the calendar, a map including a graphical representation indicating the first associated location and the second associated location, wherein displaying the map includes:
   deriving the first associated location by a processing device from the first calendar entry;
   deriving the second associated location by the processing device from the second calendar entry;
   transmitting a request including the first associated location and the second associated location to a map application for the map;
   determining, by the processing device, an estimated travel time from the first associated location to the second associated location; and
   providing a route at least partially superimposed on the map indicating a route from the first associated location to the second associated location, wherein the predetermined time is an alarm time, the alarm time based upon the second associated time and the estimated travel time.

2. A non-transitory machine readable storage medium storing executable instructions which when executed by a data processing system causes the data processing system to perform a method comprising:
storing a first calendar entry in a calendar, where the first calendar entry includes a first associated time and a first associated location;
storing a second calendar entry in the calendar, where the second calendar entry includes a second associated time and a second associated location;
displaying, at a predetermined time before the second associated time and after the first associated time has passed, in a graphical user interface with the calendar, a map including a graphical representation indicating the first associated location and the second associated location, wherein displaying the map includes:
deriving the first associated location from the first calendar entry;
deriving the second associated location by the processing device from the second calendar entry;
transmitting a request including the first associated location and the second associated location to a map application for the map;
determining, by the processing device, an estimated travel time from the first associated location to the second associated location; and
providing a route at least partially superimposed on the map indicating a route from the first associated location to the second associated location, wherein the predetermined time is an alarm time, the alarm time based upon the second associated time and the estimated travel time.

3. An apparatus comprising:
a processing device, wherein the processing device executes instructions that cause the processing device to:
store a first calendar entry in a calendar, where the first calendar entry includes a first associated time and a first associated location;
store a second calendar entry in the calendar, where the second calendar entry includes a second associated time and a second associated location;
display, at a predetermined time before the second associated time and after the first associated time has passed, in a graphical user interface with the calendar, a map including a graphical representation indicating the first associated location and the second associated location, wherein displaying the map includes:
deriving the first associated location from the first calendar entry;
deriving the second associated location by the processing device from the second calendar entry;
transmitting a request including the first associated location and the second associated location to a map application for the map;
determining, by the processing device, an estimated travel time from the first associated location to the second associated location; and
providing a route at least partially superimposed on the map indicating a route from the first associated location to the second associated location, wherein the predetermined time is an alarm time, the alarm time based upon the second associated time and the estimated travel time.

4. A method comprising:
storing a first calendar entry in a calendar, where the first calendar entry includes a first associated time and a first associated location;
storing a second calendar entry for an appointment in the calendar, wherein the second calendar entry includes a second associated time, a second associated location, and an associated person other than a user of the calendar;
deriving the first associated location by a processing device from the first calendar entry;
deriving the second associated location by the processing device from the second calendar entry;
determining, by the processing device, an estimated travel time from the first associated location to the second associated location;
displaying a graphical user interface at an alarm time, the alarm time based upon the second associated time and the estimated travel time, the graphical user interface including a map indicating a route from the first associated location to the second associated location and an auto-message user interface element; and
sending an automated message from the processing device to the associated person in response to receiving input from the user selecting the auto-message user interface element, wherein the automated message includes preset content indicating the user will be late for the appointment.

5. The method of claim 4, wherein the graphical user interface presents a view of the calendar, the method further comprising:
receiving user selection of the second calendar entry prior to the selection of the auto-message user interface element.

6. The method of claim 4, wherein the graphical user interface is displayed in response to determining that the user may be late to the appointment.

7. The method of claim 6, wherein determining that the user may late to the appointment includes determining that a time difference between a current time and the second associated time is less than the estimated travel time.

8. The method of claim 4, wherein the automated message comprises a voice message, an email message, or a short message.

9. A non-transitory machine readable storage medium storing executable instructions which when executed by a data processing system causes the data processing system to perform operations comprising:
storing a first calendar entry in a calendar, where the first calendar entry includes a first associated time and a first associated location;
storing a second calendar entry for an appointment in the calendar, wherein the second calendar entry includes a second associated time, a second associated location, and an associated person other than a user of the calendar;
deriving the first associated location by a processing device from the first calendar entry;
deriving the second associated location by the processing device from the second calendar entry;
determining an estimated travel time from the first associated location to the second associated location;
displaying a graphical user interface at an alarm time, the alarm time based upon the second associated time and the estimated travel time, the graphical user interface including a map indicating a route from the first associated location to the second associated location and an auto-message user interface element; and
sending an automated message to the associated person in response to receiving input from the user selecting the auto-message user interface element, wherein the automated message includes preset content indicating the user will be late for the appointment.

10. The non-transitory machine readable storage medium of claim 9, wherein the graphical user interface presents a view of the calendar, and the operations further comprising:
receiving user selection of the second calendar entry prior to the selection of the auto-message user interface element.

11. The non-transitory machine readable storage medium of claim 9, wherein the graphical user interface is displayed in response to determining that the user may be late to the appointment.

12. The non-transitory machine readable storage medium of claim 11,
wherein determining that the user may late to the appointment includes determining that a time difference between a current time and the second associated time is less than the estimated travel time.

13. The non-transitory machine readable storage medium of claim 9, wherein the automated message comprises a voice message, an email message, or a short message.

14. An apparatus comprising:
a processing device, wherein the processing device executes instructions that cause the processing device to:
store a first calendar entry in a calendar, where the first calendar entry includes a first associated time and a first associated location;
store a second calendar entry for an appointment in the calendar, wherein the second calendar entry includes a second associated time, a second associated location, and an associated person other than a user of the calendar;
derive the first associated location by a processing device from the first calendar entry;
derive the second associated location by the processing device from the second calendar entry;
determine an estimated travel time from the first associated location to the second associated location;
display a graphical user interface at an alarm time, the alarm time based upon the second associated time and the estimated travel time, the graphical user interface including a map indicating a route from the first associated location to the second associated location and an auto-message user interface element; and
send an automated message to the associated person in response to receiving input from the user selecting the auto-message user interface element, wherein the automated message includes preset content indicating the user will be late for the appointment.

15. The apparatus of claim 14, wherein the graphical user interface presents a view of the calendar, and wherein the processing device executes instructions that further cause the processing device to:
receive user selection of the second calendar entry prior to the selection of the auto-message user interface element.

16. The apparatus of claim 14, wherein the graphical user interface is displayed in response to determining that the user may be late to the appointment.

17. The apparatus of claim 16, wherein determining that the user may late to the appointment includes determining that a time difference between a current time and the second associated time is less than the estimated travel time.

18. The apparatus of claim 14, wherein the automated message comprises a voice message, an email message, or a short message.

* * * * *